US011381707B2

(12) United States Patent
Morovic et al.

(10) Patent No.: US 11,381,707 B2
(45) Date of Patent: Jul. 5, 2022

(54) ERROR DIFFUSION FOR PRINTING

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,775

(22) PCT Filed: Aug. 30, 2018

(86) PCT No.: PCT/US2018/048690
§ 371 (c)(1),
(2) Date: Oct. 30, 2020

(87) PCT Pub. No.: WO2020/046302
PCT Pub. Date: Mar. 5, 2020

(65) Prior Publication Data
US 2021/0099613 A1  Apr. 1, 2021

(51) Int. Cl.
*H04N 1/40* (2006.01)
*H04N 1/405* (2006.01)
(Continued)

(52) U.S. Cl.
CPC ............. *H04N 1/4052* (2013.01); *H04N 1/52* (2013.01); *H04N 19/176* (2014.11)

(58) Field of Classification Search
None
See application file for complete search history.

(56) References Cited

U.S. PATENT DOCUMENTS 6,427,030 B1    7/2002   Williams et al.
6,707,576 B1    3/2004   Chang
(Continued)

FOREIGN PATENT DOCUMENTS

EP           1298916 A2    4/2003
WO    WO-2017129254 A1    8/2017
(Continued)

OTHER PUBLICATIONS

Error Diffusion: Wavefront Traversal and Contrast Considerations.

*Primary Examiner* — Barbara D Reinier
(74) *Attorney, Agent, or Firm* — HP Inc. Patent Department

(57) ABSTRACT

There are disclosed techniques for error diffusion for printing.
For example, there is disclosed a device comprising a pixel selector, to select a pixel from an image to be printed, wherein the pixel is associated to a group of device state probabilities, wherein each device state probability describes a probability of choosing a particular device state, wherein each device state describes the quantity of each colorant to be used in correspondence of the pixel.
The device may comprise a device state determiner, to choose the device state for the selected pixel on the basis of the device state probabilities associated to the selected pixel. The device may comprise a feedback chain, to diffuse device state probability errors to pixels to be subsequently selected. The feedback chain may include a selected pixel error determiner, to determine device state probability errors for each device state probability of the selected pixel. The feedback chain may include a neighbouring pixel selector, to choose neighbouring pixels among the pixels to be subsequently selected. The feedback chain may include a neighbouring pixel error modifier, to modify, for each neighbouring pixel, the determined device state probability errors (Continued)

according to criteria conditioned by metrics and/or classification data associated to the selected pixel and/or a group of previously selected pixels and the relative position between the neighbouring pixel and the selected pixel. The feedback chain may include an error diffuser, to diffuse the modified device state probability errors to the neighbouring pixels.

15 Claims, 7 Drawing Sheets

(51) Int. Cl.
*H04N 1/52* (2006.01)
*H04N 19/176* (2014.01)

(56) References Cited

U.S. PATENT DOCUMENTS

| | | |
|---|---|---|
| 7,319,549 B2 | 1/2008 | Thakur |
| 2003/0179410 A1 | 9/2003 | Velde |
| 2005/0212816 A1 | 9/2005 | Chang |
| 2015/0324996 A1* | 11/2015 | Rius Rossell ........ H04N 1/6072 358/1.9 |
| 2016/0344895 A1* | 11/2016 | Puigardeu Aramendia ................. H04N 1/4052 |

FOREIGN PATENT DOCUMENTS

| | | | |
|---|---|---|---|
| WO | WO-2017182093 A1 * | 10/2017 | ........... G06K 9/6212 |
| WO | WO-2018140055 A1 | 8/2018 | |

* cited by examiner

ERROR DIFFUSION FOR PRINTING

BACKGROUND

Imaging systems may prepare images to be represented (e.g., printed and displayed). In imaging systems based on a device state probability pipeline, such as the Halftone Area Neugebauer Separation (HANS) pipeline, colors are treated as statistical distributions of device states. A per-pixel decision determines the final color state for the representation of each pixel.

DETAILED DESCRIPTION

Figure 1:
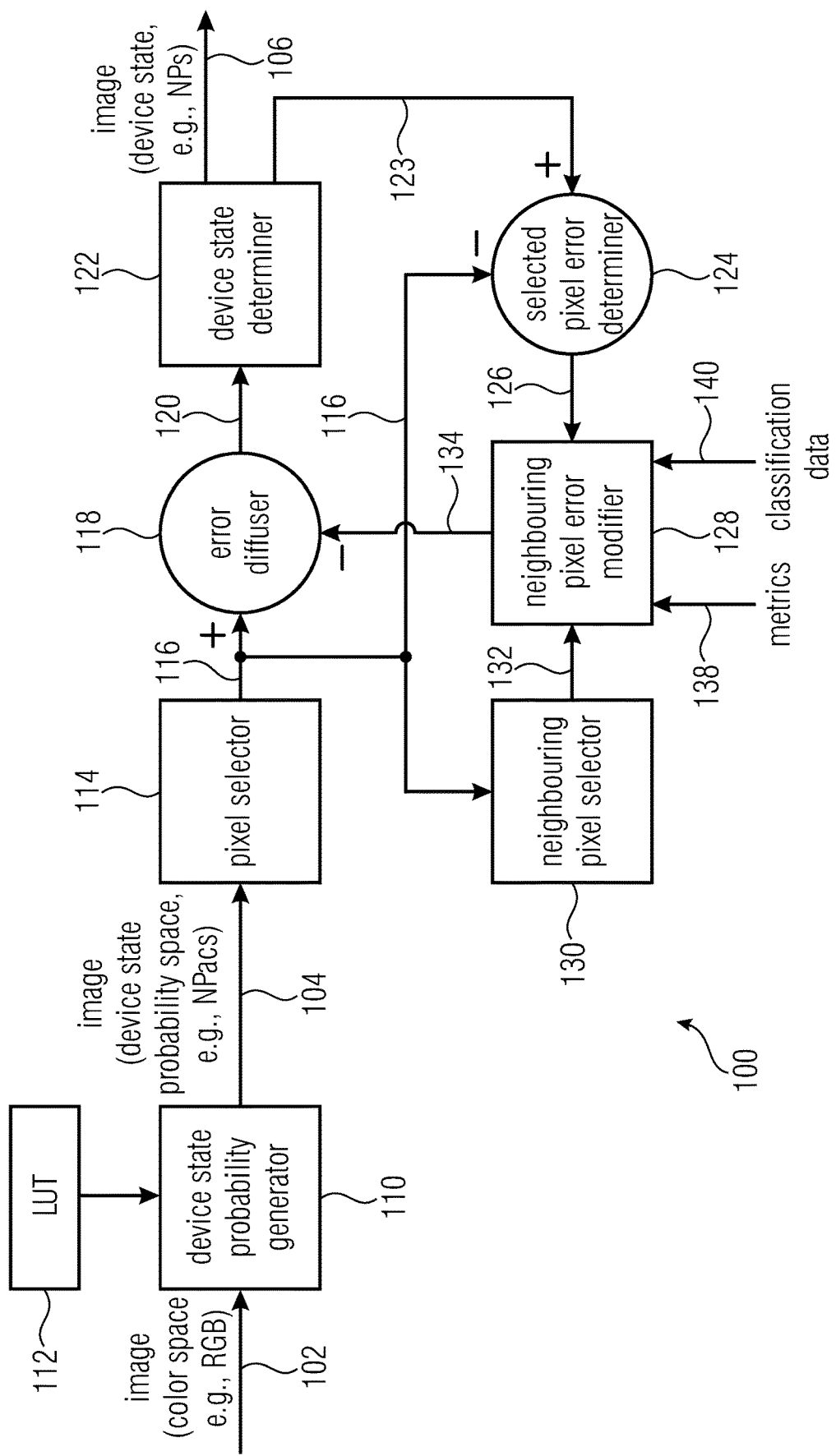
FIG. 1 shows a device according to an example.

Hereinafter, examples are mainly directed to printing systems and methods, e.g., using ink-jet printers, laser printers, xerographic printers, three-dimensional (3D) printers or other printers.

Print permits to represent images to human eye or obtain objects. Print may be bi-dimensional (2D) print or three-dimensional (3D) print. 2D print may be the result of a number of colorants of different colors disposed on top of a substrate (e.g., paper). Colorant (e.g., ink) amounts are chosen for each printable color. With 3D print, a three-dimensional object may be obtained by printing on a bed of build material. A printing system may include a printer, which may be a 2D printer or a 3D printer. In certain cases, the printer may be an inkjet printer, for example a scanning inkjet printer or a page wide array printer. The printing system may comprise a plurality of print elements. A print element may be a print head or die. A page-wide printer may use, for example, an array of print heads, each print head being a print element. A print head may include a plurality of nozzles, for example a print head may consist of silicon pieces known as dies in which the printing nozzles are formed. Each nozzle may be arranged to deposit drops of a printing fluid, such as ink, gloss or varnish. There may be a set amount of ink that is released in each drop, e.g., a large drop may have a different volume of ink to a small drop. Certain printers may deposit a plurality of ink drops when an instruction is received to actuate the nozzles, e.g., the printer may receive a command based on image data to deposit drops of ink for a given pixel.

A color may be defined with reference to a particular representation model, such as Red-Green-Blue, RGB, color space or Cyan-Magenta-Yellow-Black, CMYK, color space. Other color models include the International Commission on Illumination (CIE) 1931 XYZ color space, wherein three variables (X, 'Y' and 'Z' or tristimulus values) are used to model a color, and the CIE 1976 (L*, a*, b*-CIELAB) color space, wherein three variables represent lightness ('L*') and opposing color dimensions ('a*' and 'b*').

A colorant may be a print material, e.g., ink, toner, fluid, varnish, etc. The colorant may be defined with reference to a color space (which, in this case, may also be referred to as colorant space), which comprises the colors that may be obtained by a particular printer (or computed in a particular printing system).

For each pixel, the colorant to be actually applied on the substrate may be defined in a different space (device space). For example, the Neugebauer primary (NP) space includes all the possible combinations that may be chosen for one pixel. If a printer produces one single drop of one single ink for each pixel, a NP can be one of $2^k$ combinations of k inks. If the colorants are Cyan, Magenta, Yellow (CMY), eight NPs are defined: C, M, Y, C+M (referred to as CM), C+Y (CY), M+Y (MY), C+M+Y (CMY), and K (Blank indicating an absence of ink, which may be white in case of white paper). It may also be possible to use multi-level printers, whose print heads are able to deposit N drop levels: a NP may be for example, one of $(N+1)^k$ combinations. If, for example, two drops of ink can be applied for each of three inks, $3^3$ NPs are defined.

Halftoning techniques may permit representing images, originally expressed as continuous tones/intensities (e.g., grey scales), by using a limited number of inks (e.g., only black and white). Human eyes tend to filter images. For example, humans perceive patches of black and white marks as some kinds of average grey when viewed sufficiently far away.

An example of halftoning technique is the HANS pipeline, in this technique colors are treated as statistical distributions of device states. An original image data can comprise color data as represented in a color space (e.g., pixel representations in an Red-Green-Blue, RGB color space, represented as intensities). Then, the color data can be mapped from the first (RGB) color space to a device state probability space, such as the Neugebauer Primary area coverage (NPac) space, so that an image comprises pixels whose color values are defined in terms of probability distributions for each particular NP and for each particular pixel.

Each pixel of an image may be described with a group of device state probabilities, e.g., a NPac vector. Each component of the NPac vector defines the probability of choosing a particular NP. For example, a $NPac_1$ vector could define the following probabilities for each NP:

⅑ for W (blank or White, where the substrate is white);
0 for C;
⅖ for M;
0 for Y;
⅗ for CM;
⅑ for CY;
⅑ for MY;
⅑ for CMY.

In this case, the highest probability is associated to the device state CM (one drop of Cyan and one Drop of Magenta), which accordingly has the highest likelihood of being chosen as final device state.

Once an image is defined in terms of device state probabilities (e.g., NPacs), a choice is to be made to determine the actual device state for each pixel (e.g., the choice of one particular NP from the NPac vector). Such a determination is in general not an easy task, as it may cause unwanted artefacts. If, for example, the determination of the actual device state is performed by always choosing the NP with highest value in the NPac vector, the image will suffer, for examples, of quantization errors and will appear unnatural to a human observer. In some cases, the image may appear posterized: it can suffer of a low variety of colors, presenting a limited number of big islands of one single color.

Techniques are aimed at rendering more natural the appearance of halftoned images. According to some techniques (E.g., PARAWACS), the final device state is modified by using weights obtained from a random matrix: hence, the image appears less posterized, as there is the random possibility that the final device state is modified for some pixels. According to other techniques (e.g., feedback-based techniques), the final device state is determined by sequentially selecting the pixels according to a sequence and, after having chosen the final device state for one selected pixel, updating the NPac vector for adjacent or neighbouring pixels which are to be selected subsequently. For example, after having chosen the final device state for the selected pixel, the probability of non-chosen device states will be increased for subsequently selected pixels, while the probability of previously chosen states will be reduced for subsequently selected pixels. For example, if, for $NPac_1$, CM is chosen, the probability of choosing CM in subsequent (adjacent or neighbouring) pixels will be reduced, while the probability of choosing other NPs will be increased.

In some of these feedback-based techniques, a so-called error diffusion may be processed. Accordingly, the error in one pixel is summed to the subsequent pixels. An example may be provided based on two adjacent or neighbouring pixels 1 and 2, associated to two device probability vectors NPac, (described above), and $NPac_2$. For pixel 1, with probabilities described by $NPac_1$, CM, with probability ⅗, has been chosen as final device state: the error for the component CM is 1−⅗=⅖, and a value associated to ⅖ is therefore subtracted from the probability associated to CM for pixel 2. For pixel 1, the error for the component M is 0−⅖=−⅖, and a value associated to −⅖ is subtracted from the probability of choosing M for pixel 2. Therefore, the error diffusion tends to decrease the probability of choosing CM and increase the probability of choosing M for pixel 2.

The errors are often diffused to a multiplicity of subsequent, adjacent or neighbouring pixels. The errors are weighted using equal or different weights. For example, the error ⅖ for the component CM may be scaled (e.g., through multiplication) by a fixed coefficient which may be ¼ (to obtain ⅖*¼=0.166667) and distributed to four subsequent, adjacent or neighbouring pixels. This is in an attempt of achieving a more distributed error diffusion. In alternative, the method of Floyd-Steinberg is also based on using fixed coefficients (weights): 7/16 of the error is diffused to the pixel at the right of the selected pixel; 3/16 of the error is diffused to the pixel at the bottom-left; 5/16 of the error is diffused to the pixel below; and 1/16 is diffused to the pixel at the bottom-right. Different weight distributions may also be conceived.

There is not one single weight distribution which is optimal for any image. In some cases, it is preferable to maintain the lines of the image, while in other cases it is preferred to increase sharpness.

It has been noted that artefacts may be dependent on the content of the image. For example, lighter tones are more prone to generate repetitive patterns, which appear unpleasant to human eye.

Further, in some error diffusion techniques, there arises the possibility of choosing an evidently incorrect NP: a large error in one NP can propagate in a wrong direction, even to pixels which shall not present that NP, by virtue of error accumulation at previous pixels. Accordingly, the contour of the edges may result imprecise.

Techniques which permit to select appropriate weight distributions on the basis of the content of the images are here presented.

FIG. 1 shows a device 100. The device 100 may be a device for halftoning and, in case, printing. The device 100 may convert an image 102 defined in a color space (e.g., a bitmap) or an image 104 defined in a device state probability space (e.g., NPacs) into an image 106 defined in a device state space (e.g., NPs chosen for each pixel).

In some examples, the device 100 may comprise a device state probability generator 110, which may transform pixels defined in a color space (e.g., RGB, CMY, etc.) into pixels defined in a device state probability space (e.g., a space defined in terms of NPacs). A lookup table, LUT, 112 may be used by the device state probability generator 110, which associates colors (e.g., as defined in terms of R, G, B components) into statistical values (e.g., as defined in terms of probabilities of choosing each NP). The LUT 112 may be stored in a storage device (e.g., a non-transitory storage device) and/or may be based on calibration data obtained during a calibration session. In some examples, the elements 110 and 112 are not used, and the device 100 may directly receive the image 104 defined in terms of device state probabilities.

The device 100 may comprise a pixel selector 114. The pixel selector 114 may iteratively select, one after the other, pixels of the image 104 (e.g., all the pixel of the image). The pixel selector 114 may choose a first pixel (seed) which may be, for example, the pixel at the most left and highest position among the all pixels of the image. Subsequently, other pixels of the image will be sequentially chosen, according to a path which may be defined a priori. For example, a serpentine path may be used: after having selected one pixel, the subsequent pixel may be in the bottom, in the right or in the left. Pixel by pixel, all the pixels of the image (or at least a majority thereof) will be selected. The path may be boustrophedonic: when arriving at the margins of the image, the pixels are selected in reverse direction. Reference numeral 116 indicates the particular pixel which has been selected at each iteration.

The device 100 may comprise an error diffuser 118. The error diffuser 118 may subtract previously obtained errors (in a weighted version) from the device state probabilities (NPacs). The error diffuser 118 may provide, for the selected pixel 116, a NPac 120 which keeps into account errors (residuals) associated to determinations carried out of the previously selected pixels. It is noted, however, that it is not strictly necessary that the error is diffused to the pixels that will be selected immediately subsequently: the error is diffused to pixels which will be subsequently selected, even if not necessarily at the immediately following iteration.

The device 100 may comprise a device state determiner 122. The device state determiner 122 may choose, for the selected pixel, one particular device state. The choice may be carried out by keeping into account the probabilities (updated with the diffused errors) associated to each device state. Basically, by choosing the final NP from each NPac, a conversion from NPacs into NPs is performed. The conversion may follow additional steps, such as random or pseudo-random modifications. For example, the final device state may be modified by modifying NPacs with further weights obtained from a random matrix (e.g., a matrix normally used for PARAWACS techniques). In other cases, the device state determiner 122 may choose the device state associated to the NP with the highest probability in the NPac, for example.

A storage device may be used to store, iteration by iteration, the device state of each selected pixel, so as to form an image 106 defined as a collection of NPs.

The chosen device state is one of the NPs for each selected pixel. If CM is chosen, then the printer will generate a halftone pixel with one drop of Cyan and one drop of Magenta combined with each other.

The device 100 may present a feedback chain formed by a plurality of components aimed at diffusing the device state probability error. The feedback chain may comprise, inter alia, the error diffuser 118, a selected pixel error determiner 124, a neighbouring pixel selector 130, and a neighbouring pixel error modifier 128. At each iteration, the feedback chain prepares error information which is to be used at subsequent iterations.

The device 100 may comprise a selected pixel error determiner 124, to determine the device state probability error for each device state probability of the selected pixel. The device 100 may use information 123, provided by the device state determiner 122, indicating which NP has been chosen. For example, if a particular NP has been chosen (e.g., CM), the selected pixel error determiner 124 will be aware of that.

The selected pixel error determiner may obtain the device state probability error (residual) 126 for each NP of the NPac associated to the selected pixel. The selected pixel error determiner 124 may obtain both the knowledge of the NP chosen at the device state determiner 122 and the knowledge of the NPac 116 from which the NP has been extracted. Therefore, the selected pixel error determiner 124 may be input with the information 123 on the chosen NP and the NPac originally associated to the selected pixel 116. In particular, the input 116 refers to the NPac upstream to the error diffuser 118, i.e., the NPac as defined by the device state probability generator 110 (and not the NPac after error diffusion).

The error associated to the chosen NP (e.g., the CM in the vector $NPac_1$) may be calculated as $1-NP_{CM}$, where $NP_{CM}$ is the probability (⅗) associated to CM in vector $NPac_1$. The error associated to the non-chosen NPs will be $0-NP_i$ (with $NP_i$ being the probability associated to each $i^{th}$ NP, excluding CM, which has been selected).

The device 100 may comprise a neighbouring pixel selector 130. The neighbouring pixel selector 130 may be input with information regarding the selected pixel 116. The neighbouring pixel selector 130 may therefore choose a collection of neighbouring pixels 132 which are in the neighbourhood to the selected pixel 116. For example, pixels adjacent or neighbouring to the selected pixel may be identified by the neighbouring pixel selector 130. For example, the pixel at the right side of the selected pixel, the pixel below the selected pixel, etc., may be chosen as neighbouring pixels. Notably, however, the neighbouring pixel selector 130 is not necessarily bounded to select, as neighbouring pixels, those pixels which are immediately adjacent to the selected pixel 116. In examples, the neighbouring pixel selector 130 may select, as neighbouring pixels, an area in which some pixels are not immediately adjacent to the selected pixel 116. In examples, the neighbouring pixel selector 130 may, for example, vary the area of neighbouring pixels for different iterations. In examples, the selected neighbouring pixels are pixels which are not already selected by the pixel selector 114, and for which the final device state (NP) has not been determined at the current iteration. The neighbouring pixels 132 are pixels which will be subsequently subjected to error diffusion on the basis of the currently selected pixel 116. However, the order according to which the neighbouring pixel selector 130 selects the neighbouring pixels is not necessarily the same of the order (e.g., boustrophedonic order) according to which the pixel selector 114 selects the pixels to be processed: therefore, it is not strictly guaranteed that the neighbouring pixels 132 will be processed in the immediately subsequent iterations. In examples, the selection of the neighbouring pixels is pre-established and/or fixed.

The device 100 may comprise a neighbouring pixel error modifier 128. The neighbouring pixel error modifier 128 is in general aware of the neighbouring pixels 132 which will be subjected to error diffusion. The neighbouring pixel error modifier 128 is in general aware of the device state probability errors 126 provided by the selected pixel error determiner.

The neighbouring pixel error modifier 128 may provide, during subsequent iterations, error information 134 to the error diffuser 118, so as to diffuse the probability errors 126 to the NPacs 116 associated to the pixels which will be selected in subsequent steps. Basically, the error information 134 will be provided to the error diffuser 118 after that, in subsequent iterations, the pixel selector 114 has selected those pixels which, at the current iteration, are the neighbouring pixel 132 selected by the neighbouring pixel selector 130. Therefore, in subsequent iterations, the selected pixels 116 will be subjected to error information 134 based on the device state probability errors 126.

In general terms, the error information 134 may be a weighted version of the device state probability error 126. The weights may be, for example, coefficients in the interval [0, 1]. According to a user's selection, the weights may be chosen so that their sum is 1, greater than 1, or lower than 1. The weights may be distributed among the neighbouring pixels 132 selected by the neighbouring pixel selector 130.

More in general, the neighbouring pixel error modifier 128 may modify the probability errors 126 so as to diffuse the probability errors 126 differently to each neighbouring pixel 132.

In examples, the neighbouring pixel error modifier 128 may diffuse the probability errors 126 according to different criteria. For example, different criteria may cause a different distribution of weights, with possible different consequences on the impression provoked to a human observer.

In examples, the criteria may be defined so as to be conditioned by metrics 138 and/or by classification data 140. Different metrics or different classification data may imply a different distribution of weights.

Hence, a dynamic or content-based distribution of weights may be achieved: the weights are distributed according to a fashion which is determined by the content itself, and are, in general not constant for different selected pixels and not necessarily equal to each other for the same selected pixel.

FIGS. 2(a)-2(d) show different patterns of pixels that may be processed according to examples associated to different criteria for diffusing the probability errors. While the patterns show four neighbouring pixels for each selected pixel, different numbers of pixels may be chosen according to different examples. For example, the number of pixels may be varied, e.g., according to design options.

Figure 2A:
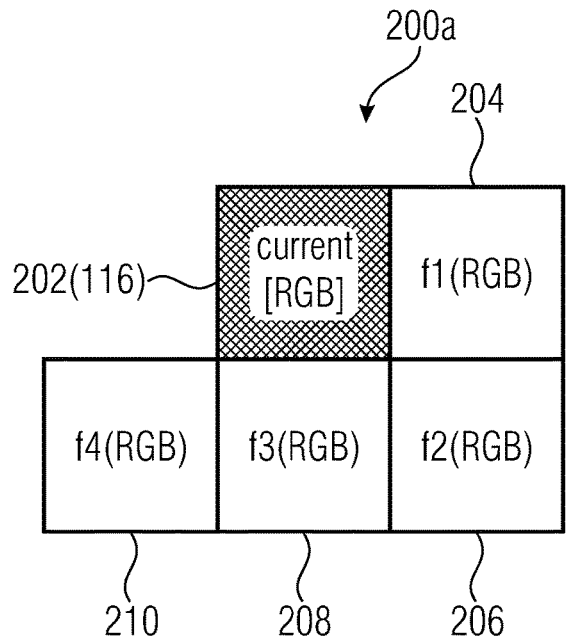
FIGS. 2a-2d show different patterns of error diffusion according to examples.

FIG. 2(a) shows a pattern 200a of pixels according to an example. A currently selected pixel 202 (which may correspond to the selected pixel 116 for which, at a current iteration, the final device state is to be chosen) permits, after having determined the final device state (NP) to be used pro printing, to determine how to diffuse device state probability errors to neighbouring pixels 204-210. The final device state for neighbouring pixels 204-210 is not determined at the current iteration. However, at the current iteration it is intended to determine how to diffuse the device state probabilities error among the neighbouring pixels 204-210 (e.g., how to determine weights which will scale the device state probability error 126).

According to examples, criteria may modify the error distribution among the neighbouring pixels 204-210 in function of metrics based on the original color data (e.g., expressed in R, G, B coordinates) of the selected pixel in the image 102. For example, the weight of the neighbouring pixel 204 may be expressed as f1(RGB); the weight of the neighbouring pixel 206 may be expressed as f2(RGB), and so on.

For example, it is possible to choose different functions (weights) f1 . . . f4 on the basis of the tone of the pixel in the original image 102. In some examples, a less uniform error distribution may be chosen in case the selected pixel 202 has a lighter tone, and a more uniform error distribution in case the selected pixel 202 has a darker tone.

E.g., it is possible to increase the weight f1 to the neighbouring pixel 204 (pixel ahead) for lighter tones and reducing the weights f2 . . . f4 of the neighbouring pixels 206-210 (pixels below and behind) in such a way that the neighbouring pixels 206-210 appear out of synchronism with respect to the selected pixel 202 and the neighbouring pixel 204. In several cases of images with lighter tones, in fact, the result is a less regular, more pleasing pattern. A benefit is reducing clustering and repetitive patterns.

To the contrary, if the tone of the selected pixel 202 has a reduced lightness, the criterion chooses more compact weights f1 . . . f4.

Figure 3:
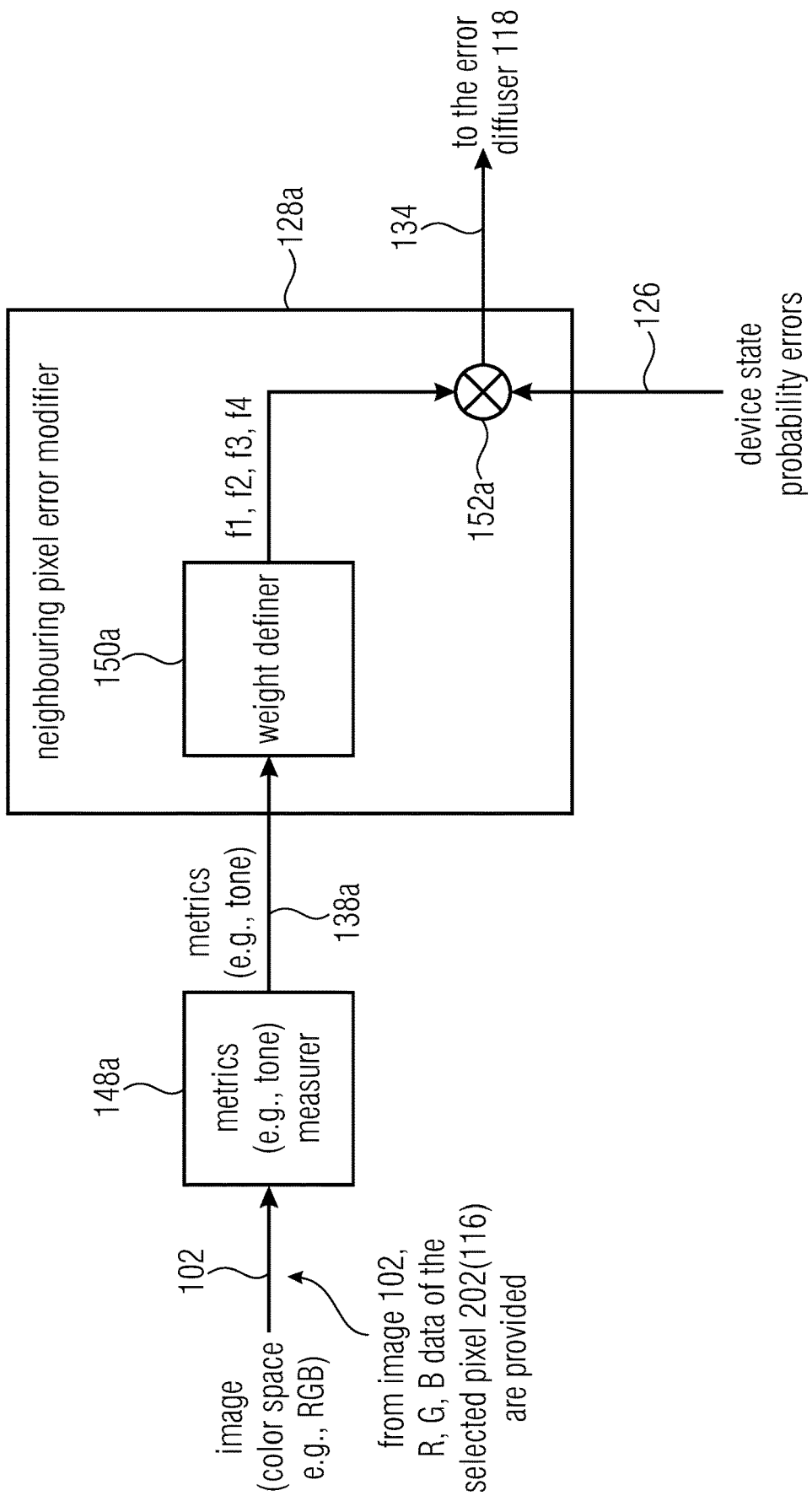
FIGS. 3-5 show devices according to examples.

FIG. 3 shows an example of a neighbouring pixel error modifier 128a which generates the pattern of FIG. 2(a). The device state probability errors 126 are modified, to obtain error information 134 to be provided to the error diffuser 118 according to criteria conditioned by color data (e.g., tone) of the selected pixel 202 (116).

The neighbouring pixel error modifier 128a may be input with metrics 138a which may comprise a tone of the selected pixel. The metrics 138a may be provided by a metrics measurer 148a, which may be, for example, a tone measurer. The tone measurer may determine the tone as the sum of the R, G, and B components of the pixel in the color space, e.g., as in the original image 102.

The neighbouring pixel error modifier 128a may comprise a weight definer 150a which determines the functions f1 . . . f4 (weights) which are to be associated to the neighbouring pixels 204-210 to properly modify the probability error 123. In some examples, the lighter the tone of the selected pixel 202, the more differentiated are the weights among different neighbouring pixels.

The neighbouring pixel error modifier 128a may comprise a device state probability error scaler 152a, which scales (e.g., by multiplication) the device state probability errors 126 by the weights f1 . . . f4. Each device state probability error 126 may be a vector of errors, each associated to a NP contained in the NPacs vector associated to the selected pixel 202. Each component of the device state probability error 126 may be multiplied by each weight f1 . . . f4. Therefore, the reference numeral 134 refers in this example to four error vectors (each of the four error vectors, associated to one of the neighbouring pixels 204-210, being derived by multiplication of a respective device state probability error 126 with one of the four weights f1 . . . f4). Each of the four vectors will therefore be used in one of subsequent iterations, for diffusing the probability errors 126 to the neighbouring pixels 204-210 (the four subsequent iterations will be those iterations for which one of the neighbouring pixels 204-210 will become the selected pixel 116).

Figure 2B:
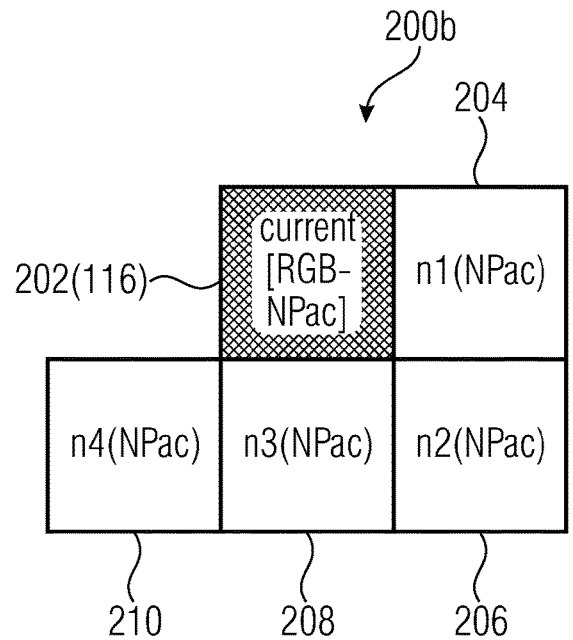
Figure 2C:
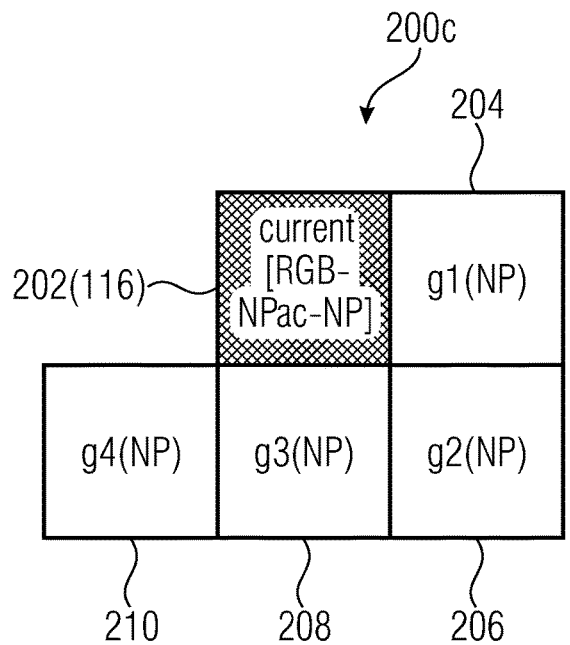
Figure 2D:
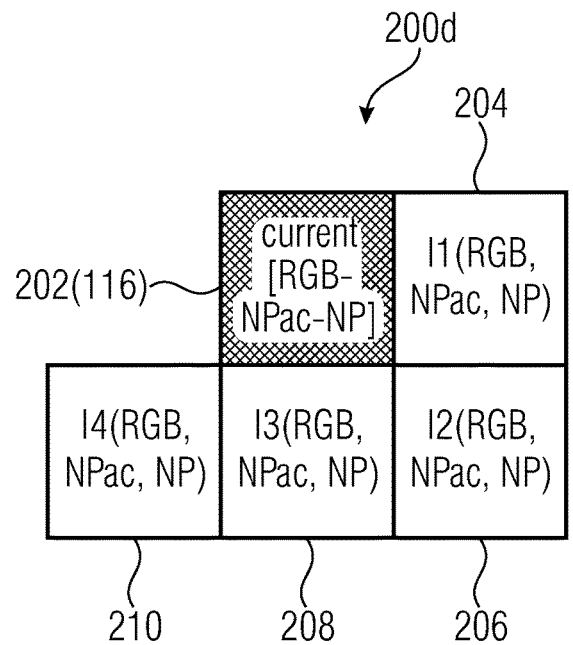

FIG. 2(b) shows a pattern 200b of pixels according to an example, with a currently selected pixel 202 and neighbouring pixels 204-210.

According to examples, the criteria may modify the error distribution among the neighbouring pixels 204-210 in function of metrics based on the device state probabilities (e.g., NPacs) of the selected pixel in the image 104. For example, the weight of the neighbouring pixel 204 may be expressed as n1(NPac); the weight of the neighbouring pixel 206 may be expressed as n2(NPac), and so on.

For example, it is possible to choose different functions n1 . . . n4 on the basis of the values of the components of the NPac of the pixel in the image 104.

For example, if the greatest error among the components of the vector forming the probability errors 126 is in MC, then an increased weight will be assigned, among the neighbouring pixels 204-210, to that pixel for which the device state probability of MC is the highest. A reduced weight will be given to the pixels having a low device state probability of MC.

In examples, increased weight may be assigned to a neighbouring pixel which has tendentially higher device state probabilities corresponding to device states associated to higher probability errors.

In examples, NPs with higher errors may be associated to neighbouring pixels having higher probability for the same NPs.

In examples, the criteria may define that, if a NP probability error is over a NP probability error threshold, higher weights will be assigned to neighbouring pixels having the probability for the same NP over a NP probability threshold.

More in general, the error diffusion may be based on correspondences between each of the device state probability errors associated to the selected pixel and each of the device state probabilities for each of the neighbouring pixels. Among the neighbouring pixels 204-210, a greater weight may be assigned to the pixel with most of the correspondences between the errors in the NPs (at the selected pixel) and the probabilities of the NPs in the NPac vector (at the neighbouring pixel).

In particular, the probability of choosing an evidently incorrect device state is reduced: a large error in one NP will not necessarily cause the print of the NP in a pixel where it is not intended. The occurrence of the choice of a device state that has zero probability at a pixel may be avoided. Therefore, an increased sharpness is obtained. In particular, the edges and the textures are better preserved.

Figure 4:
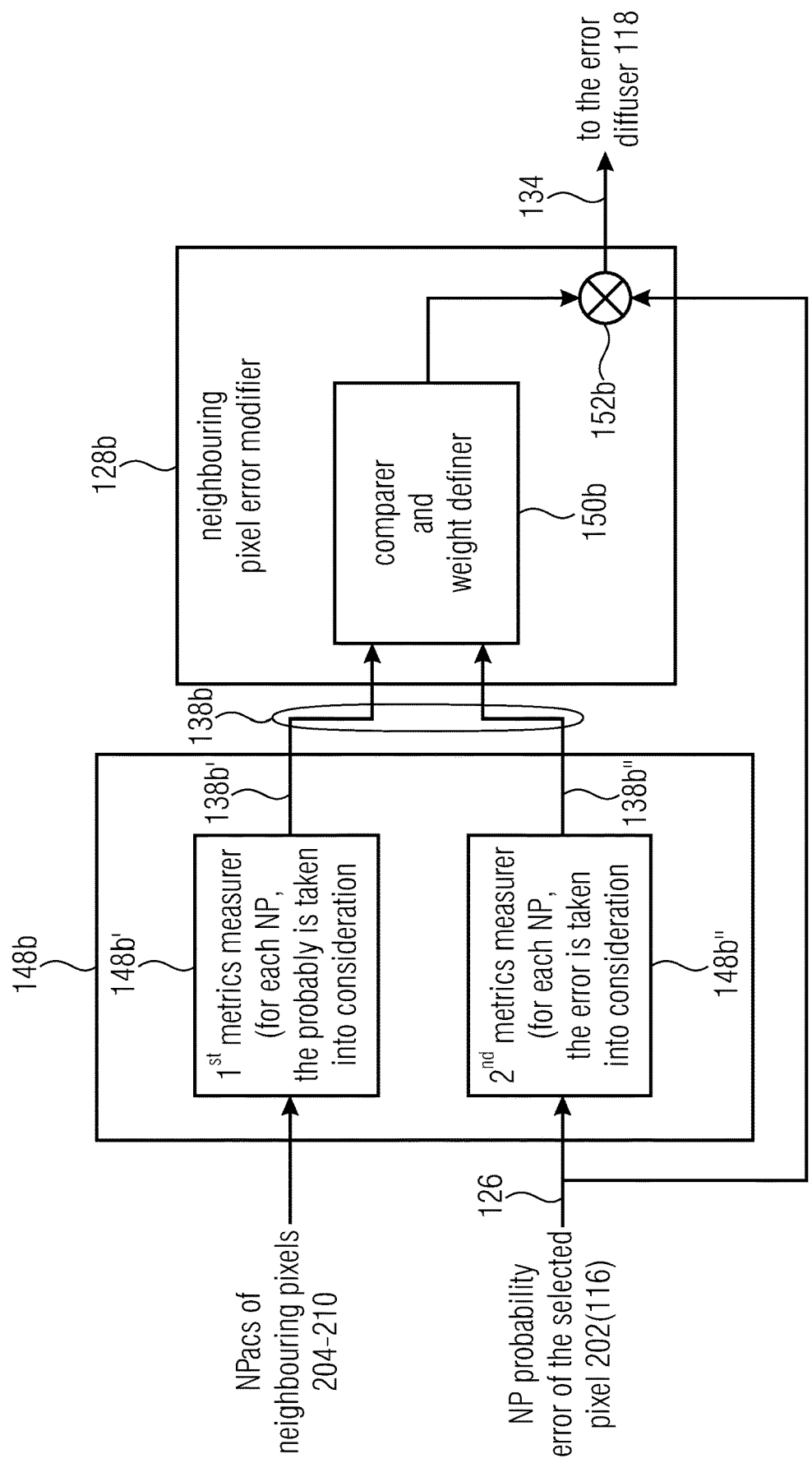

FIG. 4 shows an example of a neighbouring pixel error modifier 128b which generates the pattern 200b of FIG. 2(b). The neighbouring pixel error modifier 128b may modify device state probability errors 126 to obtain error information 134 to be provided to the error diffuser 118 according to criteria conditioned by the NPacs of the neighbouring pixels.

The neighbouring pixel error modifier 128b may be input with metrics 138b which may comprise metrics associated to the probability of each NP for the neighbouring pixels 204-210. The neighbouring pixel error modifier 128b may be input with metrics 138b which may comprise metrics associated to the NP probability errors as obtained by the selected pixel error determiner 124. The metrics 138b may be provided by a metrics measurer 148b which comprises a first metrics measurer 148b' which, for each NP, takes into account the probably of each NP, and a second metrics measurer 148b", which takes into consideration the error for each NP. The metrics measurer 148b may provide, for each neighbouring pixel, the NP with highest probability (138b').

The metrics measurer may provide the probability error 138*b*" associated to each NP of the selected pixel 202 (116).

The neighbouring pixel error modifier 128*b* may comprise a comparer and weight definer 150*b* which may choose functions n1 . . . n4 to be associated to the neighbouring pixels 204-210 on the basis of correspondences between NP probabilities of the neighbouring pixels and the NP probability errors of the selected pixel 202 (116). In examples, the highest weight may be assigned to the neighbouring pixel having the highest probability for the NP which is subjected to the maximum NP probability error.

The weights n1 . . . n4 may be used at scaler 152*b* to scale NP probability errors 126, which may be subsequently used for diffusing the errors differently for the different neighbouring pixels.

FIG. 2(*c*) shows a pattern 200*c* in which the error diffusion is determined, for each of the neighbouring pixels 204-210, on the basis of the device state value chosen for the selected pixel 202 (116) (e.g., by the device state determiner 122). In this case, the error diffusion may interest a reduced group among the components of the NPac vector. For example, weights g1 . . . g4 are used for some particular NPs, and are not used (or are defined as 0) for different NPs. Let be assumed, for example, that only NPs with C are chosen. Therefore, the error will be diffused only in the components C, CM, CY, but the no error diffusion will be performed on the components Y, M, YM, B, as no C is implied. This is how to limit the error diffusion to a particular vectorial subspace, while avoiding the error diffusion in the complementary vectorial subspace. Hence, if in the NPac some NP have zero probability, they will not participate to error diffusion.

Hence, it is possible to define different weights for different probabilities associated to the same selected pixel.

In examples, the criteria for diffusing the errors may be different for different device states. Just to give an example, it may be possible to use first criteria (e.g., associated to the tone of the selected pixel) for a first group of NPs, and second criteria for a second group of NPs.

Accordingly, it is possible to optimize the print for a particular ink, hence resulting in smoother prints.

FIG. 4 shows a pattern 200*d* in which, according to the criteria, error diffusion is determined, for each of the neighbouring pixels 204-210, on the basis of metrics associated to some particular attributes of the pixel or a neighbourhood of pixels. The weights, here identified as l1 . . . l4, may vary according to the attribute.

For example, it is possible to check whether the error diffusion will change attributes of the neighbouring pixel. For example, it is possible to try a plurality of error diffusion mode candidates and to choose the error diffusion mode which least modifies the attribute. For example, it is possible to assign increased weights to the neighbouring pixels which least change the attribute. For example, in case the criteria is to minimize the lightness contrast between neighbouring pixels, larger weights are provided to those neighbouring pixels which would minimize the change in lightness contrast.

Figure 5:
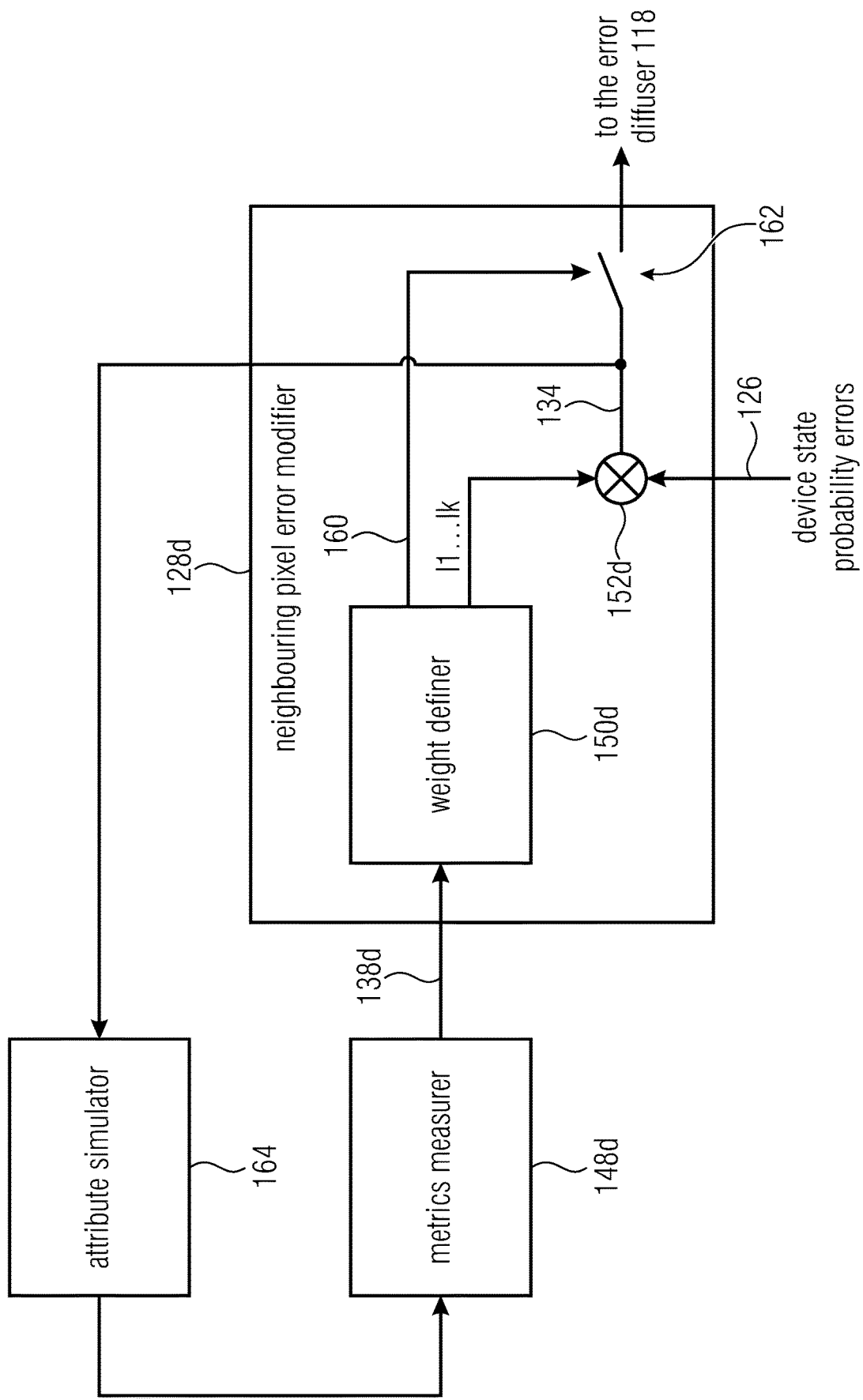

FIG. 5 shows a neighbouring pixel error modifier 128*d* which may be used for obtaining the pattern 200*d* according to a criteria based on a particular attribute. A weight definer 150*d* may define a collection of weights l1 . . . lk. These weights may scale, at scaler 152*d*, the device state probability errors 126, to obtain error information 134. The weight definer 150*d*, through the command 160, maintains open a switch 162 which does not permit to provide the error information 134 to the error diffuser 118. However, the obtained error information 134 may be provided to an attribute simulator 164, which simulates the results of the print (with the particular weights l1 . . . lk) for a particular attribute (e.g., lightness contrast). Metrics 138*d* associated to the attribute may be measured by the metrics measurer 148*d*. On the basis of the metrics 138*d*, the weight definer 150*d* may decide for a different collection of weights l1 . . . lk. Hence, a plurality of iterations are attempted for obtaining the best collection of weights. When the best collection of weights is determined (e.g., that that minimizes the lightness contrast), the switch 162 may be closed by command 160 and the weighted error information 134 may be provided to the error diffuser 118. By examining the result for several simulations, the most appropriated error diffusion mode may be selected.

In additional or alternative, the weight definer 150*d* may choose decide among a plurality of criteria, such as one of those discussed above. The chosen criterion may be the one that permits to obtain the minimization of the lightness contrast.

Back to FIG. 1, classification data 140 may be used in addition or alternative to metrics 138.

For example, each pixel may be associated to classification data such as "line", "photographic content", "text", "business", etc. The classification data may be used to define different error diffusion modes (e.g., different weights) for different neighbouring pixels. For example, if the selected pixel 202 and the neighbouring pixel 204 are classified as "line" while the neighbouring pixels 206-210 are not classified as "line", a greater amount of the error will be diffused from the selected pixel 202 to the neighbouring pixel 204, while a reduced amount of error will be diffused to the remaining neighbouring pixels 206-210.

In the examples above, reference has been made to metrics associated to the currently selected pixel. In addition or alternative, the metrics may also relate to previously selected pixels or to both previously selected pixels and the currently selected pixel. For example, aggregate data (e.g., integrals data) and/or statistical data (e.g., average values) may be used as metrics for calculating the weights.

Figure 6:
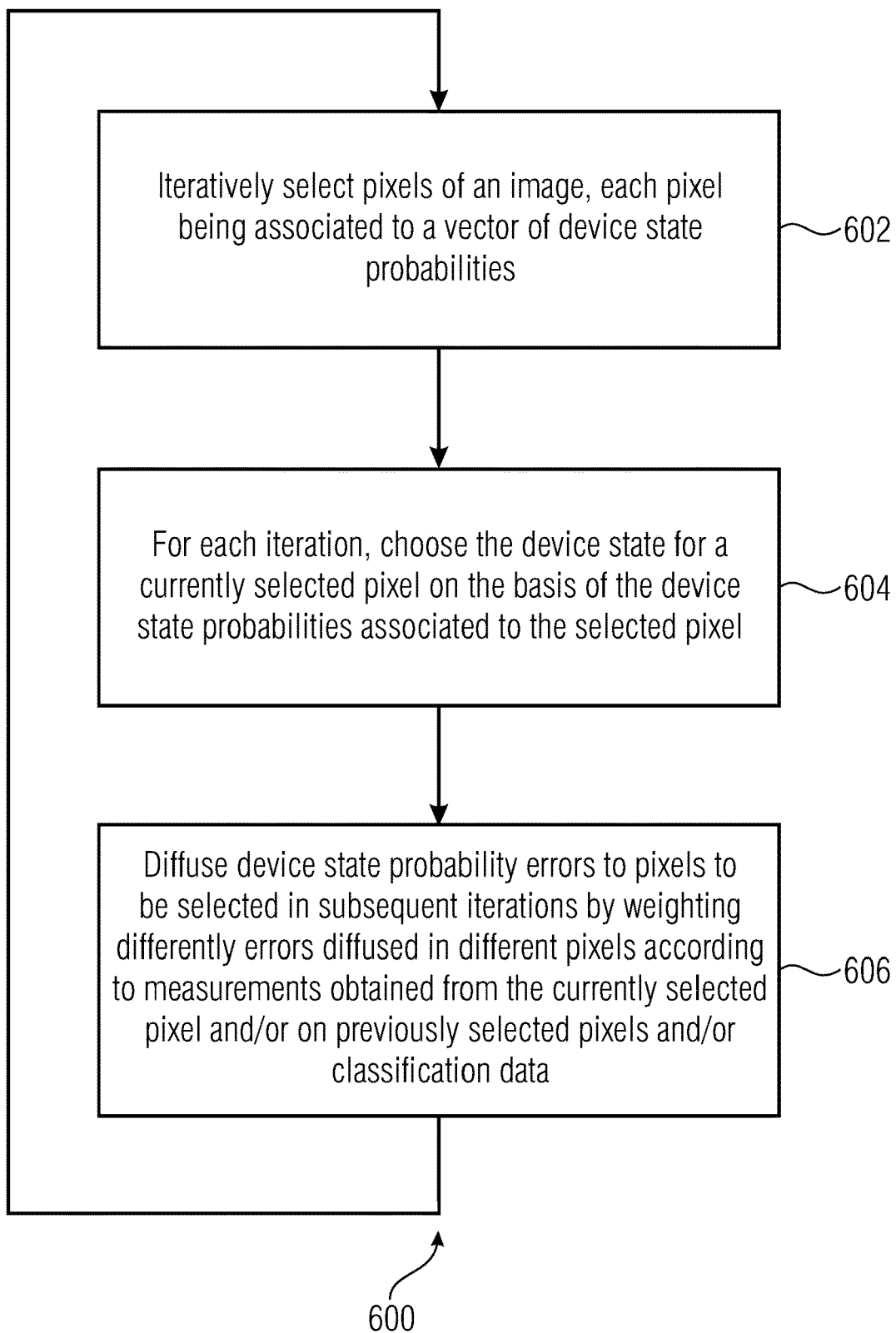
FIG. 6 shows a method according to an example.

FIG. 6 shows a method 600. The method 600 may be implemented, for example, using equipment discussed above. At step 602, the method may comprise iteratively selecting pixels of an image. Each pixel may be associated to a vector of device state probabilities. Each element of the vector may relate to a probability of choosing a particular device state. Each device state may describe the quantity of each colorant to be used in correspondence of the pixel. At step 604, the device state is chosen for a currently selected pixel on the basis of the device state probabilities associated to the selected pixel. At step 606, device state probability errors are diffused to pixels to be selected in subsequent iterations. For example, it is possible to weight differently errors diffused in different pixels according to measurements obtained from the currently selected pixel and/or on previously selected pixels and/or classification data.

Figure 7:
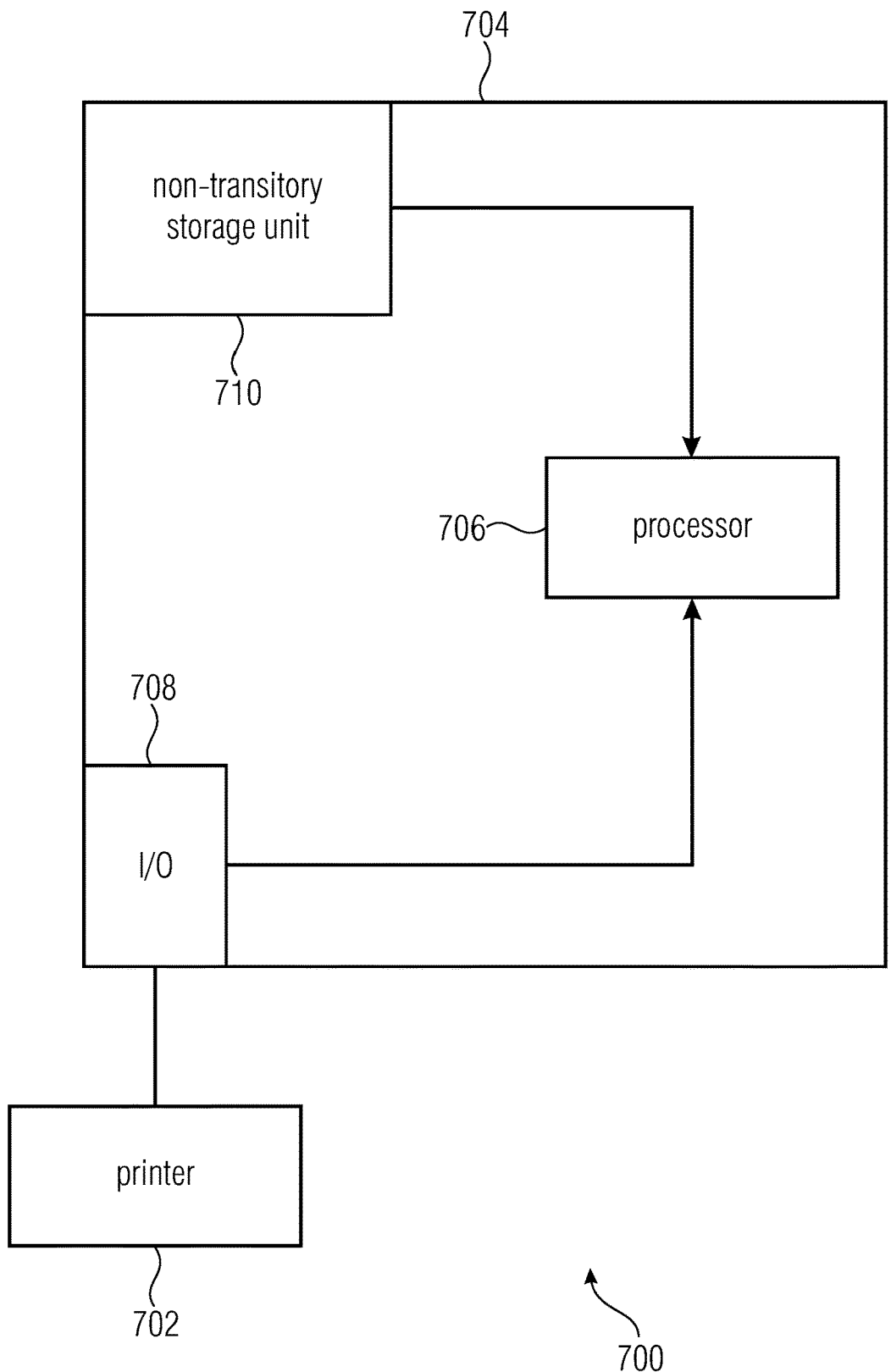
FIG. 7 shows a non-transitory storage unit according to an example.

FIG. 7 shows a processor-based system 700. The system 700 may comprise a printer 702 and a processor-based system 704 comprising a processor 706. The processor 706 may communicate with the printer through an input/output, I/O, port 708. The processor-based system 704 may comprise a non-transitory storage unit 710. The non-transitory storage unit 710 my comprise instruction which, when executed by the processor 706, may perform the method 600. In particular, the instructions 600 may guide the processor to select a pixel associated to device state probabilities describing probabilities of choosing particular device states describing quantities of colorant to be used in correspondence of the pixel. Further, the instructions may guide the processor to choose a device state for the pixel on the basis of the device state probabilities. The instructions may cause the processor to diffuse device state probability errors to pixels to be subsequently selected. The instructions may cause the processor to determine, for the pixels to be subsequently selected, device state probability errors. The instructions may cause the processor to choose neighbouring pixels among the pixels to be subsequently selected. The instructions may cause the processor to modify a neighbouring pixel error, to modify, for each neighbouring pixel, the determined device state probability errors according to weights conditioned by metrics and/or classification data associated to the pixel and/or a group of previously selected pixels and the relative position between the neighbouring pixel and the selected pixel. The instructions may cause the processor to diffuse the modified device state probability errors to the neighbouring pixels.

Generally, examples can be implemented as a computer program product with a program code, the program code being operative for performing one of the methods when the computer program product runs on a computer. The program code may for example be stored on a machine readable carrier.

Other examples comprise the computer program for performing one of the methods described herein, stored on a machine readable carrier.

In other words, an example of method is, therefore, a computer program having a program code for performing one of the methods described herein, when the computer program runs on a computer.

A further example of the methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further example of the method is, therefore, a data stream or a sequence of signals representing the computer program for performing one of the methods described herein. The data stream or the sequence of signals may for example be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware.

The methods described herein may be performed using a hardware apparatus, or using a computer, or using a combination of a hardware apparatus and a computer.

The methods described herein, or any components of the apparatus described herein, may be performed at least partially by hardware.

The above described examples are merely illustrative for the principles discussed above. It is understood that modifications and variations of the arrangements and the details described herein will be apparent to others skilled in the art. It is the intent, therefore, to be limited only by the scope of the impending patent claims and not by the specific details presented by way of description and explanation of the examples herein.

The invention claimed is:

1. A device comprising:
   a pixel selector, to select a pixel from an image to be printed, wherein the pixel is associated to a group of device state probabilities, wherein each device state probability describes a probability of choosing a particular device state, wherein each device state describes the quantity of each colorant to be used in correspondence of the pixel;
   a device state determiner, to choose the device state for the selected pixel on the basis of the device state probabilities associated to the selected pixel;
   a feedback chain, to diffuse device state probability errors to pixels to be subsequently selected, wherein the feedback chain includes:
      a selected pixel error determiner, to determine device state probability errors for each device state probability of the selected pixel;
      a neighbouring pixel selector, to choose neighbouring pixels among the pixels to be subsequently selected;
      a neighbouring pixel error modifier, to modify, for each neighbouring pixel, the determined device state probability errors according to criteria conditioned by:
         metrics and/or classification data associated to the selected pixel and/or a group of previously selected pixels; and
         the relative position between the neighbouring pixel and the selected pixel; and
      an error diffuser, to diffuse the modified device state probability errors to the neighbouring pixels.

2. The device of claim 1, wherein the neighbouring pixel error modifier is to modify the determined device state probability errors according to criteria conditioned by color data of the image to be printed.

3. The device of claim 1, wherein the neighbouring pixel error modifier is to modify the determined device state probability errors according to criteria conditioned by the tone of the selected pixel, the criteria being so as to cause, among the neighbouring pixels:
   a less uniform error distribution among the neighbouring pixels in case the selected pixel has a lighter tone; and
   a more uniform error distribution among the neighbouring pixels in case the selected pixel has a less light tone.

4. The device of claim 1, wherein the neighbouring pixel error modifier is to modify the determined device state probability errors according to criteria conditioned by device state probabilities of the image to be printed.

5. The device of claim 1, wherein the neighbouring pixel error modifier is to modify the determined device state probability errors according to criteria to diffuse the device state probability errors on the basis of correspondences between:
each of the device state probability errors associated to the selected pixel; and
each of the device state probabilities for each of the neighbouring pixels.

6. The device of claim 1, wherein the neighbouring pixel error modifier is to modify the determined device state probability errors according to criteria to diffuse the device state probability errors so that, if a device state probability error is over a device state probability error threshold, higher weights are given to neighbouring pixels having the probability, for the same device state, over a NP probability threshold.

7. The device of claim 1, wherein the neighbouring pixel error modifier is to modify the determined device state probability errors so as to:
increase weights for neighbouring pixels whose higher device state probabilities correspond to device states associated to higher probability errors; and
reduce weights for neighbouring pixels whose higher device state probabilities correspond to device states associated to lower probability errors.

8. The device of claim 1, wherein the neighbouring pixel error modifier is to modify the determined device state probability errors according to criteria which are different for different probabilities associated to the same selected pixel.

9. The device of claim 1, wherein the neighbouring pixel error modifier is to avoid error diffusion towards pixels which have zero probability for a selected colorant.

10. The device of claim 1, wherein the neighbouring pixel error modifier is to modify the determined device state probability errors on the basis of criteria based on multiple simulations on the effects of different modes for error diffusion, wherein the neighbouring pixel error modifier is to modify the determined device state probability errors based on a mode for error diffusion that best conforms to the criteria.

11. The device of claim 1, wherein the neighbouring pixel error modifier is to modify the determined device state probability errors on the basis of multiple simulations performed with different criteria, wherein the neighbouring pixel error modifier is to modify the determined device state probability errors based on a mode for error diffusion that best conforms to a respective criterion of a respective simulation.

12. The device of claim 1, wherein the neighbouring pixel error modifier is to modify the determined device state probability errors on the basis of metrics based on simulation of the lightness contrast among pixels, wherein the neighbouring pixel error modifier is to modify the determined device state probability errors to correspond to a minimized lightness contrast among pixels.

13. The device of claim 1, wherein the neighbouring pixel selector is to select a number of neighbouring pixels based on a selected error diffusion distance.

14. A method comprising:
iteratively selecting pixels of an image, each pixel being associated to a vector of device state probabilities, wherein each element of the vector relates to a probability of choosing a particular device state, wherein each device state describes the quantity of each colorant to be used in correspondence of the pixel;
at each iteration, choosing the device state for a currently selected pixel on the basis of the device state probabilities associated to the selected pixel;
diffusing device state probability errors to pixels to be selected in subsequent iterations by weighting differently errors diffused in different pixels according to measurements obtained from the currently selected pixel and/or on previously selected pixels and/or classification data.

15. A non-transitory storage unit storing instructions which, when executed by a processor, cause the processor to:
select a pixel associated to device state probabilities describing probabilities of choosing particular device states describing quantities of colorant to be used in correspondence of the pixel;
choose a device state for the pixel on the basis of the device state probabilities;
diffuse device state probability errors to pixels to be subsequently selected;
determine, for the pixels to be subsequently selected, device state probability errors;
choose neighbouring pixels among the pixels to be subsequently selected;
modify a neighbouring pixel error, to modify, for each neighbouring pixel, the determined device state probability errors according to weights conditioned by:
metrics and/or classification data associated to the pixel and/or a group of previously selected pixels; and
the relative position between the neighbouring pixel and the selected pixel; and
diffuse the modified device state probability errors to the neighbouring pixels.

* * * * *